(12) United States Patent
Kodan

(10) Patent No.: US 6,323,965 B1
(45) Date of Patent: Nov. 27, 2001

(54) IMAGE READING APPARATUS CAPABLE OF CORRECTING IMAGE DATA AND METHOD FOR CORRECTING THE SAME

(75) Inventor: Kanehisa Kodan, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/119,874

(22) Filed: Jul. 21, 1998

(30) Foreign Application Priority Data

Jul. 23, 1997 (JP) .................................................. 9-197618

(51) Int. Cl.⁷ .................................................. H04N 1/40
(52) U.S. Cl. .................................................. 358/475; 358/509
(58) Field of Search .................................. 358/474, 475, 358/509, 520; 382/312, 313

(56) References Cited

U.S. PATENT DOCUMENTS

| | | | |
|---|---|---|---|
| 4,818,856 | * 4/1989 | Matsushima | 235/472 |
| 5,585,926 | 12/1996 | Fujii et al. | 358/471 |
| 5,950,018 | * 9/1999 | Keler | 396/20 |

FOREIGN PATENT DOCUMENTS

| | | | | |
|---|---|---|---|---|
| 63-204864 | * 8/1988 | (JP) | | H04N/1/00 |
| 63-266961 | * 11/1998 | (JP) | | H04N/1/04 |
| 404219065A | * 8/1992 | (JP) | | H04N/1/40 |

* cited by examiner

*Primary Examiner*—Jerome Grant, II
(74) *Attorney, Agent, or Firm*—Sidley Austin Brown & Wood (57) ABSTRACT

The image reading apparatus which has an external-light detecting sensor arranged in a position out of the effect of light from an irradiator attached to the apparatus itself, detects an external-light amount which enters into a document surface by use of the sensor, and calculates a main-scan shading corrective coefficient for correcting output value of each pixel in a CCD in response to the detected external-light amount. Therefore, the output value of each pixel in the CCD is accurately corrected based on the calculated coefficient. This allows photographing data to be accurately corrected in response to the external light amount.

15 Claims, 8 Drawing Sheets

# IMAGE READING APPARATUS CAPABLE OF CORRECTING IMAGE DATA AND METHOD FOR CORRECTING THE SAME

This application is based on U.S. patent application Ser. No. 9-197618 filed in Japan, the contents of which are hereby incorporated by reference.

BACKGROUND OF THE INVENTION

This invention relates generally to an image reading apparatus, and particularly to a correction of shading in a main-scan direction in the image reading apparatus in which a document is loaded face up.

In a conventional image reading apparatus in which the document is loaded face up, it has been known that, concerning the correction of image data in a main-scan direction, a corrective coefficient is factory-set up based on an irradiated-light data in a central part of the apparatus, and a main-scan shading correction is carried out based on the set corrective coefficient for correcting the image data in the main-scan direction.

Figure 8:
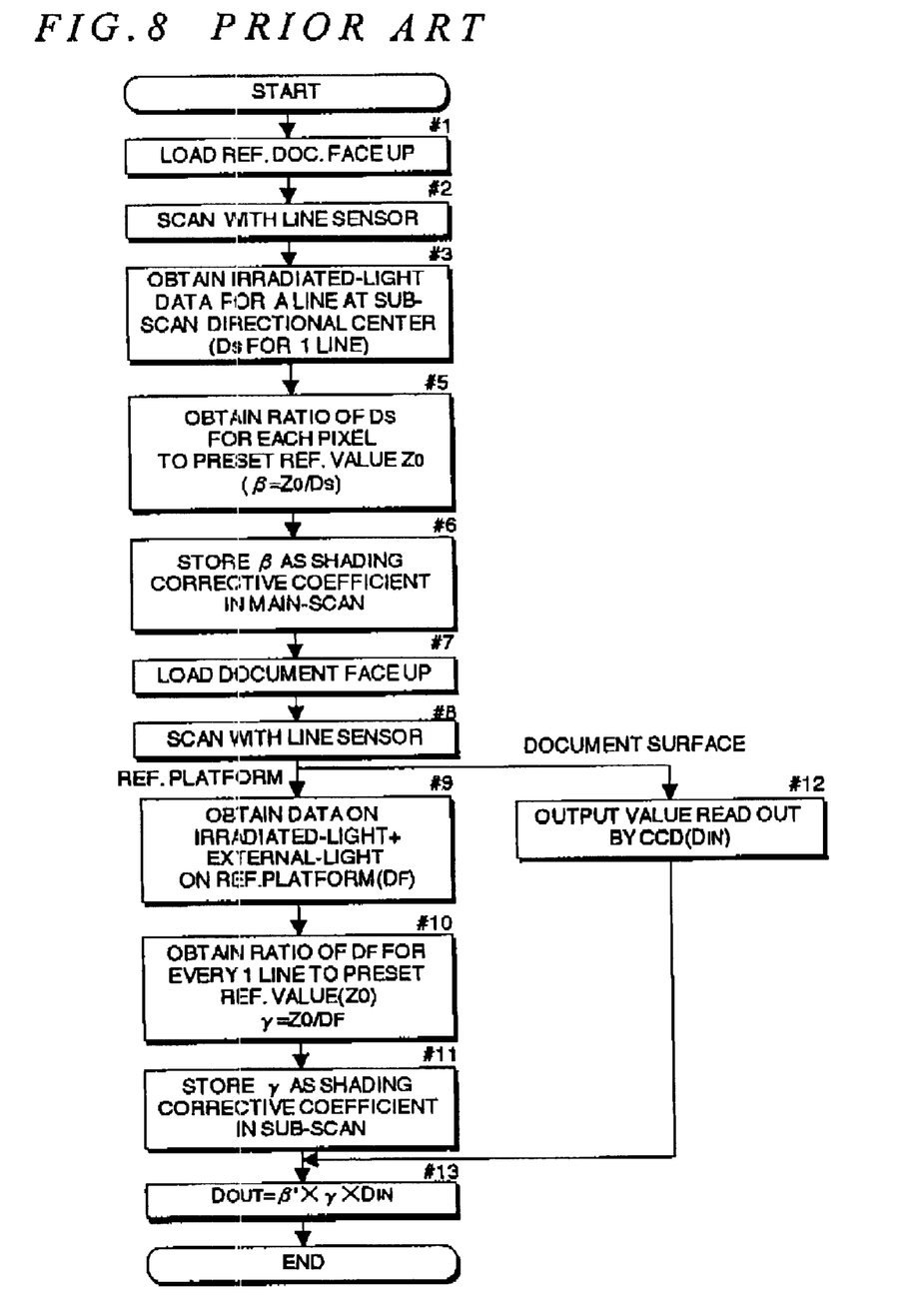
FIG. 8 is a flowchart showing an outline of a procedure for shading correction in a main-scanning direction and a sub-scanning direction in a conventional image reading apparatus.

Now, the explanation is given to a procedure for correcting the shading in a main-scanning direction (direction that pixels in a line sensor are aligned) and a sub-scanning direction (perpendicular direction to the main scanning direction) (hereinafter referred to as a main-scan shading correction and a sub-scan shading correction) in the conventional image reading apparatus with reference to a flowchart shown in FIG. 8. First of all, in a factory-shipment condition in which a document table is lit up only by an irradiator attached to the apparatus itself, a reference document having a uniform density is loaded face up (#1), and read out from above by a charge-coupled device (hereinafter referred to as CCD) line sensor (#2). Thereby, data concerning the irradiated light for a main-scan directional line at a sub-scan directional central part ($D_S$ for one line) is obtained (#3). After that, a ratio of the irradiated-light output value $D_S$ of each pixel in the data obtained in the step #3 to a preset reference value $Z_0$) of each pixel in the CCD is determined by the following equation [1] (#5). The value β determined in the step #5 is stored as a main-scan shading corrective coefficient which is used in a later-described process (#6).

$$\beta = Z_0/D_S \quad [1]$$

β: main-scan shading corrective coefficient of each pixel in CCD $D_S$: irradiated-light output value of each pixel when the CCD reads out a main-scan directional line in a central part of the apparatus under only the irradiated light at the factory $Z_0$: output reference value of each pixel after the correction (constant)

Next, under the service conditions for a user in which the external light enters as well as the light from the irradiator attached to the apparatus, a document is loaded face up on the document table (#7). The CCD scans and reads out from above the document surface and a reference platform which is arranged in the sub-scan direction for correcting nonuniformity in illuminance (#8), following which, the $D_F$ (data on the irradiated light and external light on the reference platform) is obtained (#9). After that, the ratio γ of the above-obtained $D_F$ (data on the irradiated light and external light for each of sub-scan directional lines on the reference platform) to the $Z_0$ (preset output reference value of each pixel in CCD) is calculated according to the following equation [2] (#10), and the calculated ratio γ is stored as a sub-scan shading corrective coefficient (#11).

$$\gamma = Z_0/D_F \quad [2]$$

Further, the output value which is read out from each pixel in the CCD for scanning the document surface in the step #8, is assumed $D_{IN}$ (#12). Following the steps #11 and #12, the shading corrective processing is carried out for the output value $D_{IN}$, and the $D_{OUT}$ (output value of each pixel after correction) is determined by the following equation (#13):

$$D_{OUT} = \beta \times \gamma \times D_{IN} \quad [3]$$

However, the above-mentioned conventional image reading apparatus applies the main-scan shading corrective coefficient which is calculated based on the output value of each pixel read out in the central part of the apparatus under the light from the irradiator only, in order to carry out the main-scan shading correction for the output value of each pixel which is read out in a condition that both of the irradiated light and external light are entering. Therefore, there results a problem that the output value of each pixel after the correction brings on an over-correction.

Figure 9:
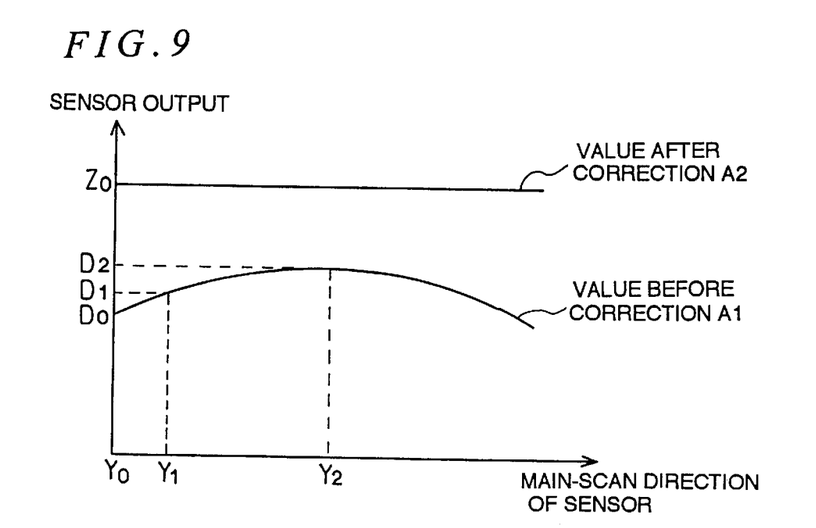
FIG. 9 is a view explaining a principle of shading correction in the main-scanning direction, and, FIG. 10 is a view showing output values of a CCD line sensor before and after shading correction in the main scanning direction under service condition of the conventional image reading apparatus.
Figure 10:
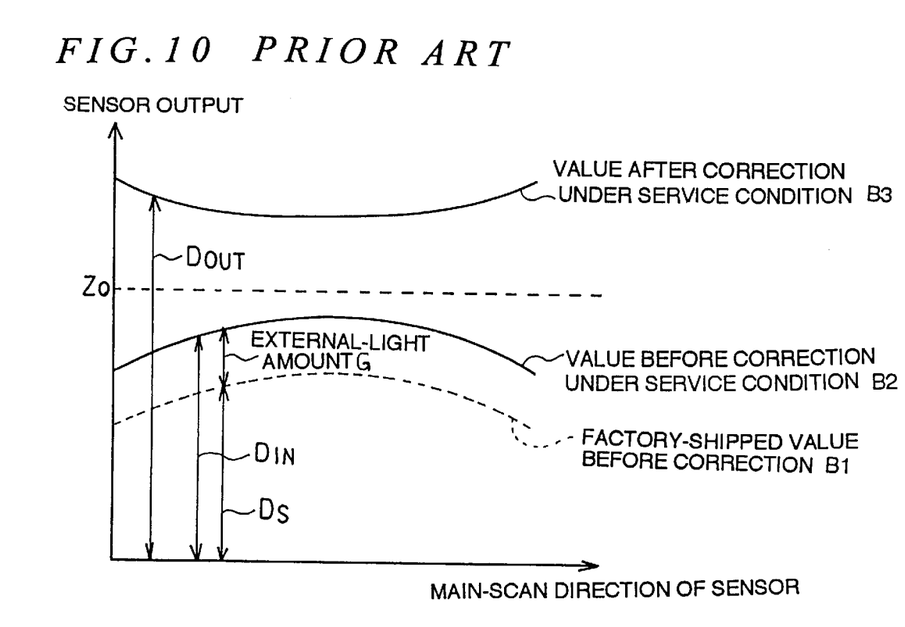

Referring to FIGS. 9 and 10, the following explains the detail of the above-mentioned problem. In FIG. 9, the reference numeral A1 designates the output value of each pixel in the CCD when the CCD reads out a main-scan directional line in a central part of the apparatus under the light only from the irradiator at the factory. Due to the nonuniformity in the illuminance of the irradiated light in the main-scan direction, the values A1 are curved as shown in the figure. Also, in FIG. 9, the reference numeral A2 designates the output value of each pixel in CCD after correcting the main-scan shading which is obtained by multiplying the value A1 by the main-scan shading corrective coefficient β. When the document surface to be read out has a uniform reflectance, it is desired that the output value from the CCD take on the uniform numerical value. Multiplied by the main-scan shading corrective coefficient β, the output value A1 becomes the output value A2 (the output reference value $Z_0$) which is the value in the uniform illuminance seemingly.

However, under the service condition for a user, in addition to the light from the irradiator attached to the apparatus, the external light enters into the document surface. Therefore, the $D_{IN}$ (output value of each pixel when the CCD reads out a main-scan directional line) takes on the value below:

$$D_{IN} = D_S + G \quad [4]$$

$D_{IN}$: output value of each pixel when the CCD reads out a main-scan directional line under the service condition $D_S$: irradiated-light output value of each pixel G: external-light amount As a result, with the main-scan shading correction on the basis of the corrective coefficient β, the $D_{OUT}$ (output value of each pixel after the main-scan shading correction) is determined by the following equation:

$$D_{OUT} = \beta \times D_{IN} \quad [5.1]$$

$D_{OUT}$: output value of each pixel after the main-scan shading correction

Substituting the above equations [1] and [4] in this equation [5.1] yields the equation below:

$$D_{OUT}=(Z_0/D_S)\times(D_S+G) \quad [5.2]$$

When the above-mentioned output value $D_{OUT}$ is equal to the $Z_0$ (output reference value of each pixel after the correction), the following equation is derived by the above equation [5.2]:

$$Z_0=(Z_0/D_S)\times(D_S+G) \quad [6.1]$$

$Z_0$: output reference value of each pixel after the correction (constant)

This equation is expanded as follows:

$$Z_0=Z_0+(Z_0\times G)/D_S \quad [6.2]$$

The above equation [6.2] is derived when the external-light amount G is 0, that is, in the case that the document image is read out under the light only from the irradiator, and with the absence of external light into the document surface. However, since the image reading apparatus for loading the document face up is constructed such that the external light will enter into the document surface, it is impossible to accurately correct the main-scan shading with the equation [5.2]. As shown in FIG. 10, a curve B2 which indicates the output values of each pixel in the CCD in a main-scan directional line effected by the external light, being corrected by the corrective coefficient β, becomes a curve B3, which brings on the over-correction.

In order to achieve the above-mentioned objectives, according to one aspect of the present invention, an image reading apparatus comprises: an irradiator which lights up a document of which image is to be read out; an image reader which obtains image data by reading out the image of the document lit up by light from the irradiator; a detector which is disposed in a position unaffected by the light from the irradiator, and detects an amount of light which enters from a light source other than the irradiator; a coefficient generator which generates a coefficient for correcting the image data obtained by the image reader, in response to the light amount detected by the detector; and, a corrector which corrects the image data obtained by the image reader, based on the coefficient generated by the coefficient generator.

According to further aspects of the present invention, a method for correcting image data which is obtained by reading out a document image lit up by light from an irradiator, comprises: a step of detecting an amount of light which enters from a light source other than the irradiator in a position unaffected by light from the irradiator; a step of obtaining a coefficient for correcting image data by using the light amount detected in said light amount detecting step; a step of obtaining the image data by reading out an image of the document lit up by the light from the irradiator; and, a step of correcting the image data obtained in said image data obtaining step by using the coefficient obtained in said coefficient obtaining step.

DETAILED DESCRIPTION OF THE PREFERRED EMBODIMENT OF THE PRESENT INVENTION

Figure 1:
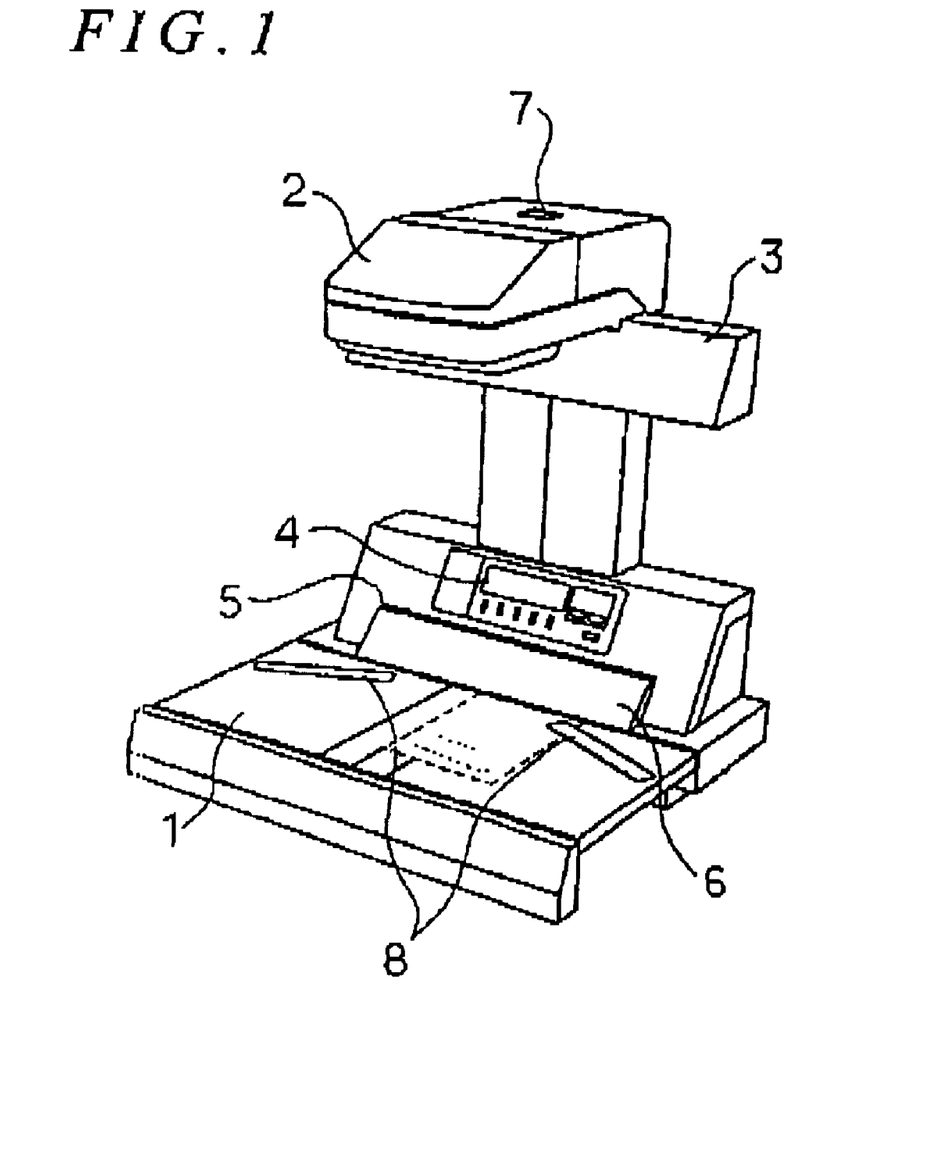
FIG. 1 is an external view of an image reading apparatus according to the first embodiment of the present invention.

The preferred embodiments of the present invention will be explained referring to the accompanying drawings. In FIG. 1 showing an external view of an image reading apparatus according to the first embodiment of the present invention, the image reading apparatus comprises a document table 1 on which a document such as a book or a file is placed face up, that is, in a state that a surface having an image to be read out faces upward. Above the document table 1, there are provided an image-pickup unit 2 and a DC (direct current) irradiator 3. The image-pickup unit 2 optically reads out the image of the document placed on the document table 1. The DC irradiator 3 lights up the document in a document reading operation. In the rear of the document table 1, there are provided an operation panel 4, a reference platform 5 and a distance-measuring mirror 6. The operation panel 4 is a panel for setting each of operation modes and displaying operational states such as an error and the like. The reference platform 5 detects nonuniformity in illuminance on the document table 1 in a sub-scanning direction of the image reading apparatus. The distance-measuring mirror 6 is a reflection mirror for detecting a document height.

Also, the image reading apparatus comprises an external-light detecting sensor 7 at the top surface of the image-pickup unit 2. The sensor 7 detects a light amount of the external light to enter in thereto at power-up. In accordance with the detected light amount, a coefficient for correcting line data in a main-scanning direction which are read out by the image-pickup unit 2 (main-scan shading corrective coefficient), is calculated by a later-described control circuit including a CPU and a multiplier. Pressing down a start key 8 disposed on the document table 1 starts document reading. The document image on the document table 1 illuminated by the external-light source and the DC irradiator 3 is read out by a CCD (charge-coupled device) 10 (refer to FIG. 2) which is disposed inside the image-pickup unit 2, and the CPU executes the correction based on the main-scan shading corrective coefficient for output value of each pixel in the main scanning direction.

The conventional image reading apparatus applies a main-scan shading corrective coefficient β (refer to equation [1]) which is calculated based on the output value (irradiated-light value) $D_S$ of each pixel read out in the central part of the apparatus under only the irradiated light, in order to carry out the main-scan shading correction for the output value $D_{IN}$ of each pixel which is read out in a condition that both of the irradiated light and external light are entering. Therefore, the output value $D_{OUT}$ of each pixel after the correction brings on an over-correction. However, the present embodiment applies a corrective coefficient β' which is determined by the following equation in consideration of the external light.

$$\beta' = Z_0/(D_S+G) \quad [1]'$$

β': corrective coefficient of each pixel in the CCD 10 in consideration of irradiated light and external light $D_S$: irradiated-light output value of each pixel G: external-light amount detected by the sensor 7

$Z_0$: output reference value of each pixel after the correction (constant)

As mentioned above, instead of the corrective coefficient β which is calculated based on the irradiated-light value $D_S$ which is obtained under the light only from the irradiator 3, the corrective coefficient β' considering both of the irradiated light and external light is applied, thereby, the $D_{OUT}$ (output value of each pixel after correction) always represents the output reference value $Z_0$ even in a condition that G is not equal to 0 which means that the external light illuminates the document surface. This is demonstrated by the following equation [5.1]' which is comparable to the above-mentioned equation [5.1].

$$D_{OUT} = \beta' \times D_{IN} \quad [5.1]'$$

$D_{IN}$: output value of each pixel when the CCD 10 reads out a main-scan directional line under service condition $D_{OUT}$: output value of each pixel after the main-scan shading correction Substituting the equations [1]' and [4] in the equation [5.1]' yields as follows:

$$D_{OUT} = \{Z_0/(D_S+G)\} \times (D_S+G) = Z_0 \quad [7]$$

As expanded above, the $D_{OUT}$ (output value of each pixel after the main-scan shading correction) always represents the output reference value $Z_0$ even in a condition that the external light illuminates the document surface. Accordingly, the line data in the main-scanning direction is accurately corrected in response to the external-light amount which enters into the document surface.

Figure 2A:
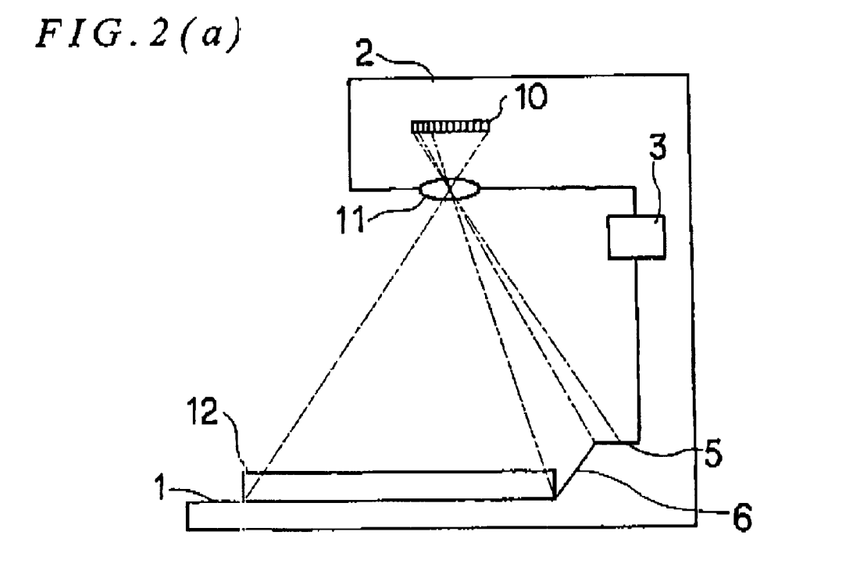
FIGS. 2(a) and 2(b) are respectively a structural side view and a structural front view of the image reading apparatus.
Figure 2B:
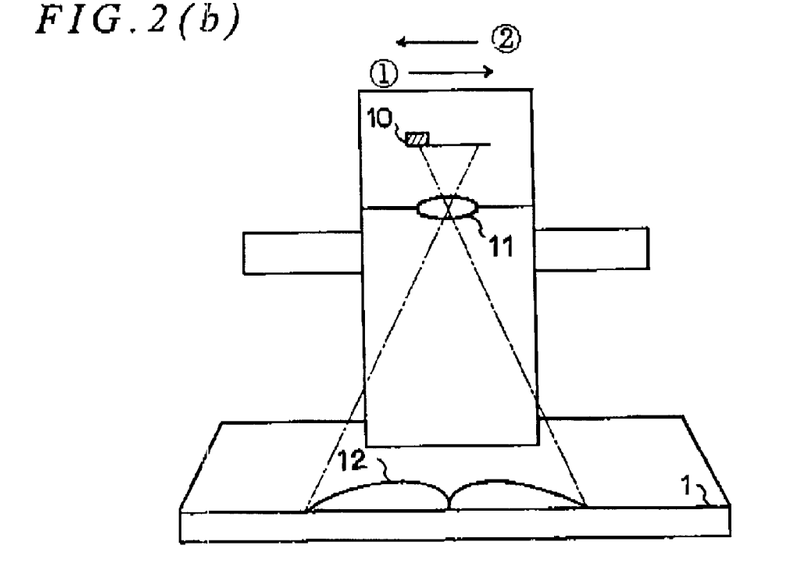

FIGS. 2(a) and 2(b) are structural views showing the image reading apparatus. The image-pickup unit 2 comprises the CCD 10 and a lens 11. The CCD 10 is an image-pick up device for reading out an image on the document surface. The lens 11 projects the image into the CCD 10. The CCD 10 carries out a pre-scan in a direction ① shown in FIG. 2(b), then, the main-scan in a direction ② for picking up the image data of a document 12 on the document table 1.

Figure 3:
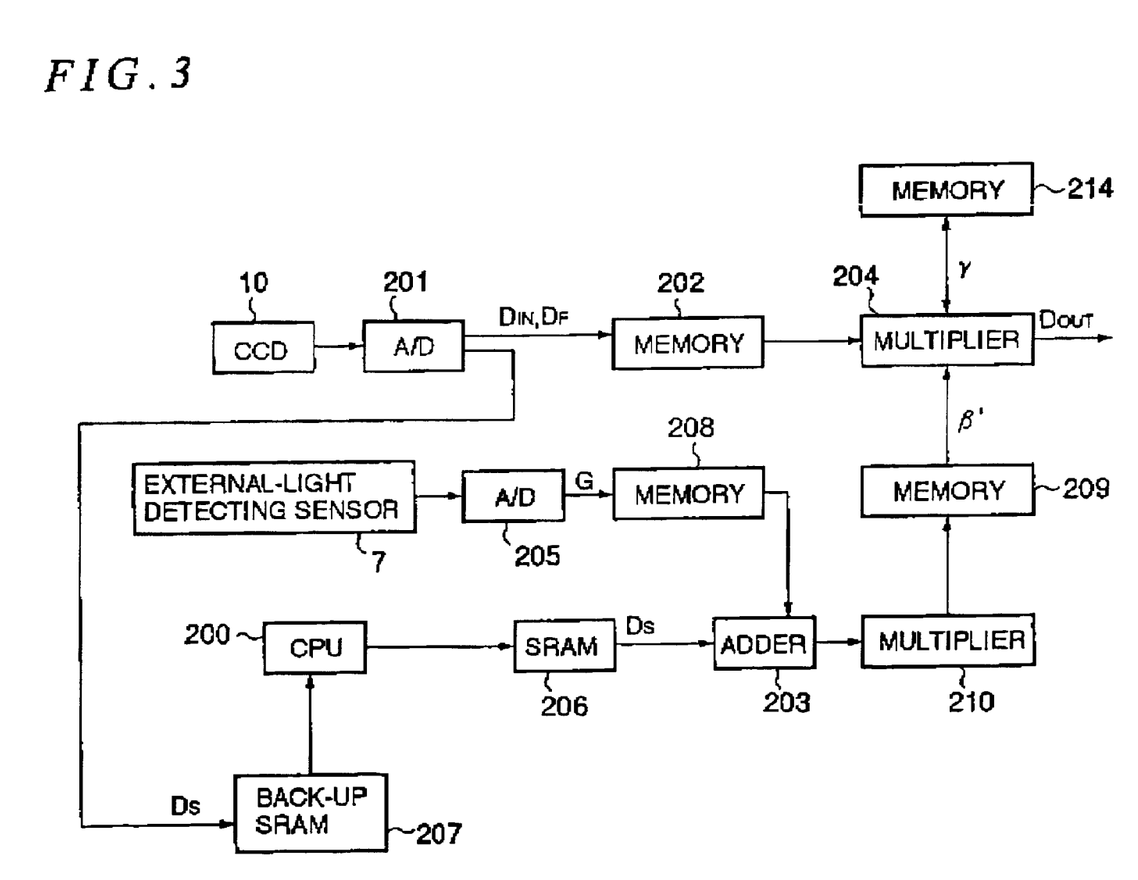
FIG. 3 is a block diagram of a control circuit of the image reading apparatus.

In FIG. 3 showing the block diagram of the control unit in the image reading apparatus, the CCD 10 is connected with a A/D (analog/digital) converter 201 for converting the $D_{IN}$ (the output value of each pixel in the CCD 10 in the main-scan) and the $D_F$ (the data on the irradiated light and external light in the pre-scan) into digital data. The $D_{IN}$ and $D_F$ which have been converted into the digital data by the A/D converter 201, are outputted through a memory 202 into a multiplier 204. The multiplier 204 is also connected to a memory 214. The memory 214 stores a sub-scan shading corrective coefficient γ which is calculated in the multiplier 204 based on the $D_F$ (data on the irradiated light and external light). The external-light detecting sensor 7 is connected to an A/D converter 205 which converts the detected external-light amount G into the digital data. The external-light amount G which has been converted into the digital data is outputted through a memory 208 into an adder 203.

Also, a back-up SRAM 207 stores the $D_S$ (output value of the irradiated light) which was read out by the CCD 10, and converted into the digital data by the A/D converter 201 at a factory. The $D_S$ is outputted into an adder 203 through a SRAM 206 by a CPU (central processing unit) 200 at power-up. The adder 203 and a multiplier 210 which is connected thereto, calculate the main-scan shading corrective coefficient β' based on the inputted G (external-light amount) and $D_S$ (output value of the irradiated light), and then, the calculated coefficient β' is stored in a memory 209. The multiplier 204 carries out the shading correction for the output value $D_{IN}$ of each pixel inputted from the memory 202 based on the main-scan shading corrective coefficient β' stored in the memory 209 and the sub-scan shading corrective coefficient γ stored in the memory 214, and then, calculates the $D_{OUT}$ (output value of each pixel after shading correction).

Referring to FIGS. 1–4, a processing flow in the image reading apparatus will be explained in paragraphs that follow. The first explanation is given to a procedure for obtaining the $D_S$ (output value of the irradiated light) at the factory. In a condition that the external light is cut off, and only the DC irradiator 3 lights up the document table 1, a reference document having a uniform density is loaded face up (#1), and read out from above by the CCD 10 (#2). Thereby, data concerning the irradiated light for a main-scan directional line at a sub-scan directional central part ($D_S$ for one line) is obtained (#3). After that, the Ds (output value of the irradiated light) which has been converted into the digital data by the A/D converter 201 are stored into the back-up SRAM 207.

Figure 4:
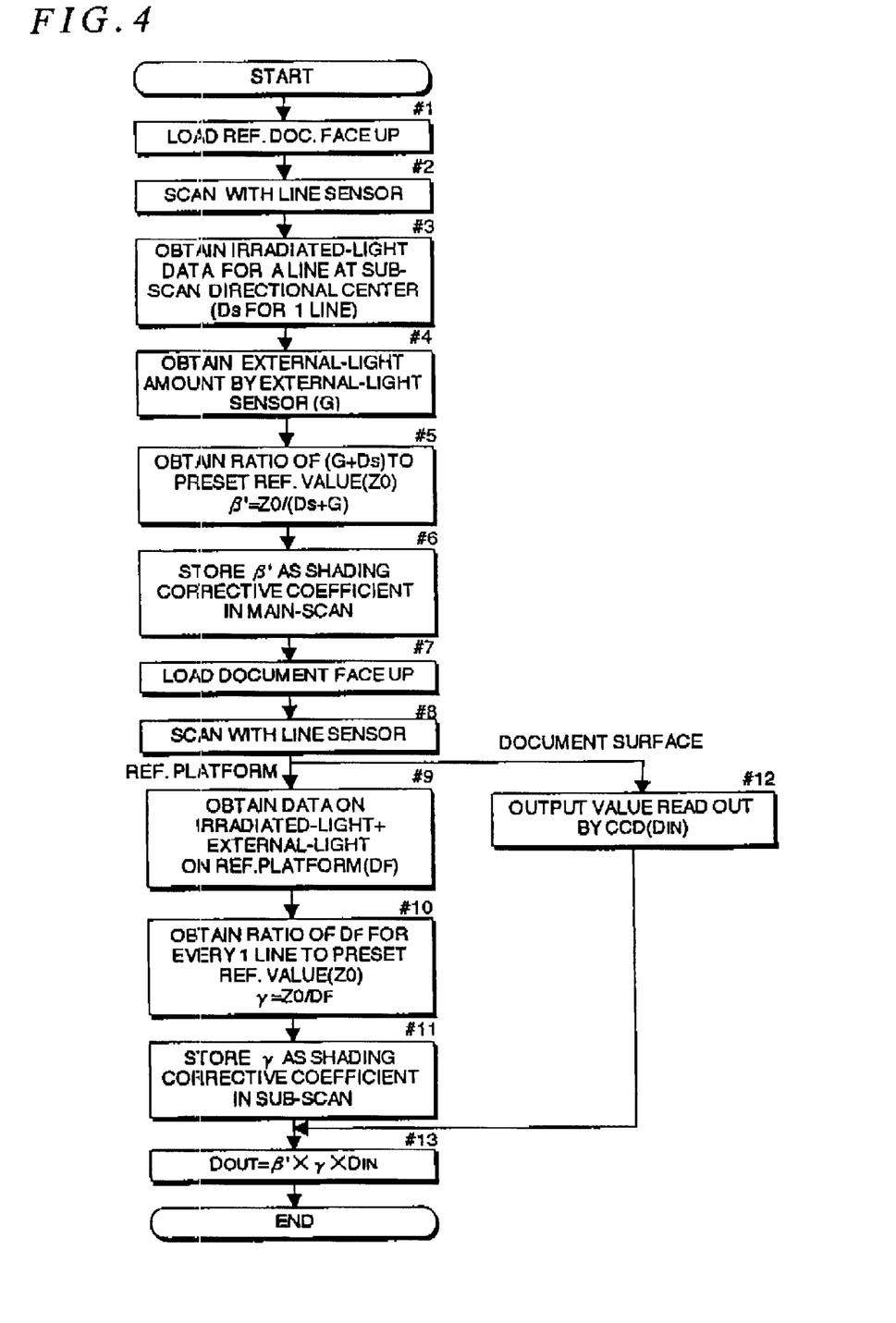
FIG. 4 is a flowchart showing an outline of a procedure for shading correction in a main-scanning direction and a sub-scanning direction in the image reading apparatus.

Secondly, the explanation is given to a calculating process for the main-scan shading corrective coefficient β' at power-up. The sensor 7 detects the light amount of the external light, and the A/D converter 205 converts the detected light amount into the digital data, and then, the converted external-light amount G is stored into the memory 208 (#4). The CPU 200 inputs the $D_S$ (output value of the irradiated light) which has been transmitted from the back-up SRAM 207 into the SRAM 206, and the external-light amount G which has been stored in the memory 208, into the adder 203 for adding. The determined value ($D_S+G$) are inputted into the multiplier 210, and a ratio β' to a preset reference value $Z_0$ of each pixel is obtained from the equation [1]' (#5). The obtained ratio is stored in the memory 209 as the main-scan shading corrective coefficient β' (#6).

Next, a procedure for shading correction in the document reading operation will be described as follows. The document 12 is loaded face up on the document table 1 and the start key 8 is turned on (#7), following which, the CCD 10 carries out the sub-scan in the direction ① shown in FIG. 2(b) (pre-scan), then, the sub-scan in the direction ② (main-scan) (#8). After that, the data on the irradiated light and external light in the reference platform 5 which is read by the CCD 10 in the pre-scan operation, is converted into the digital data by the A/D converter 201, and stored as the data $D_F$ into the memory 202 (#9). Next, the $D_F$ (data on the irradiated light and external light) is inputted into the multiplier 204 for calculating the ratio γ to the $Z_0$ (preset output reference value of each pixel in CCD) according to the previously-mentioned equation [2] (#10). The calculated ratio is stored as the sub-scan shading corrective coefficient γ in the memory 214 (#11). Also, as for the image data on the document 12 which is read by each pixel of the CCD 10 in the main-scan operation, it is converted into the digital data by the A/D converter 201, and stored as the $D_{IN}$ (output value of each pixel in the CCD 10) in the memory 202 (#12). Then, the $D_{IN}$ (output value of each pixel) in the memory 202, the β' (main-scan shading corrective coefficient) in the memory 209, and the γ (sub-scan shading corrective coefficient) in the memory 214 are inputted into the multiplier 204 for performing a computation shown by a following equation. Thereby, the $D_{OUT}$ (output value of each pixel after shading correction) is determined (#13).

$$D_{OUT}=\beta' \times \gamma \times D_{IN} \qquad [3]'$$

As described above, in the image reading apparatus of the first embodiment, the sensor 7 placed out of the effect of the DC irradiator 3 detects the external-light amount G which enters into the document surface, and the coefficients β' for correcting the $D_{IN}$ (output value of each pixel in a main-scan directional line) are obtained according to the equation [1]' in response to the external-light amount G. Then, the $D_{IN}$ (output value of each pixel in the line) can be corrected based on the coefficient β'. Consequently, this allows the $D_{IN}$ (output value of each pixel) to be accurately corrected in response to the external-light amount.

Figure 5:
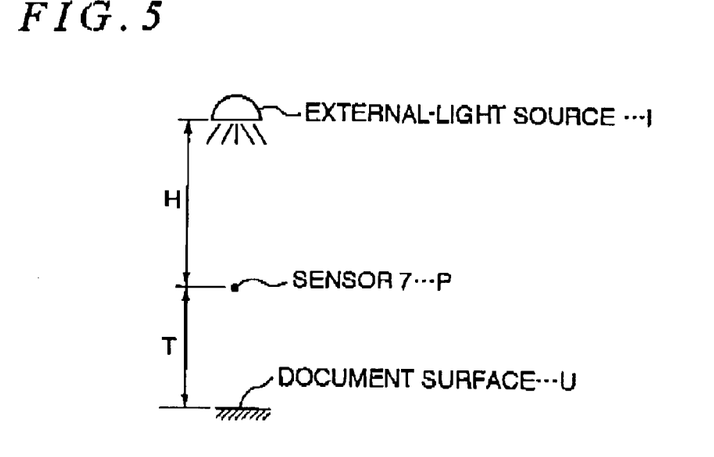
FIG. 5 is an explanatory view showing a positional relationship between an external-light source, an external-light detecting sensor and a document surface of an image reading apparatus according to the second embodiment of the present invention.

Now, the second embodiment of the present invention will be explained referring to FIG. 5. In the first embodiment, the main-scan shading corrective coefficient β' is determined on the basis of the external-light amount G in a condition of regarding the amount G detected by the sensor 7 as the external-light amount entering into the document surface. However, in this case, if there occurs a difference between the external-light amount G entering into the sensor 7 and the external-light amount entering into the document surface, an error will arise in the main-scan shading corrective coefficient β'. Compared to the first embodiment, the second embodiment shows a configuration in which an external-light amount U which enters into the document surface is found based on an external-light amount P which enters into the sensor 7, and the main-scan shading corrective coefficient β' is determined on the basis of the external-light amount U.

A method for calculating the external-light amount U which enters into the document surface will be described as follows. Supposing that a height difference between the external-light source and the sensor 7 is H, and a height difference between the sensor 7 and the document surface is T, according to that the illuminance is inversely proportional to the second power of the distance, the external-light amount P which enters into the sensor 7 and the external-light amount U which enters into the document surface are represented by the equations below:

$$P=I/H^2 \qquad [8.1]$$

$$U=I/(H+T)^2 \qquad [8.2]$$

I: luminous intensity of the external-light source

According to the above equations [8.1] and [8.2], the following equation will be derived:

$$P:U=(I/H^2):\{I/(H+T)^2\} \qquad [8.3]$$

According to the equation [8.3], the external-light amount U which enters into the document surface will be represented by the equation below:

$$U=P\times\{H^2/(H+T)^2\} \qquad [8.4]$$

Next, a procedure for calculating the external-light amount U from the above equation [8.4] will be explained. First of all, the H (height difference between the external-light source and the sensor 7) is measured, and stored in the memory inside the apparatus. Then, the T (height difference between the sensor 7 and the document surface) is stored in the memory of the apparatus prior to the image reading operation. After that, the sensor 7 detects the external-light amount P entering in thereto. Substituting the external-light amount P, height differences H and T in the equation [8.4] determines the external-light amount U which enters into the document surface. Instead of the external-light amount G in the first embodiment, substituting the external-light amount U in the equation [1]' accurately yields the main-scan shading corrective coefficient β' considering the height difference between the sensor 7 and the document surface.

Figure 6:
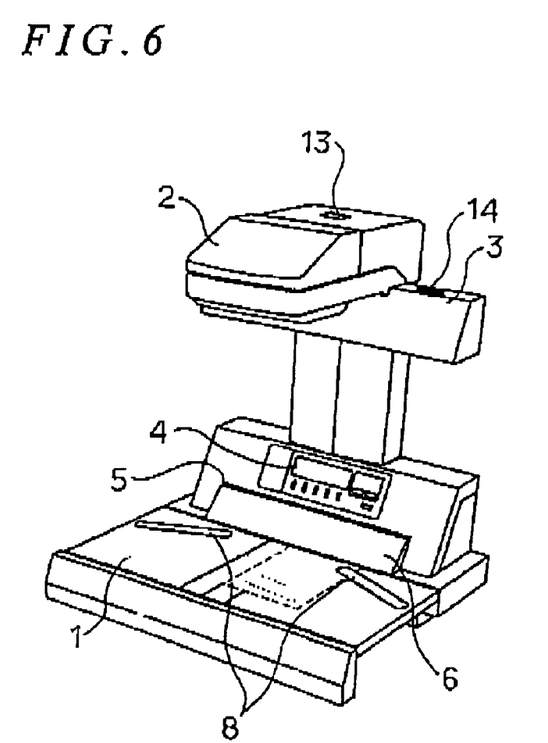
FIG. 6 is an external view of an image reading apparatus according to the third embodiment of the present invention.
Figure 7:
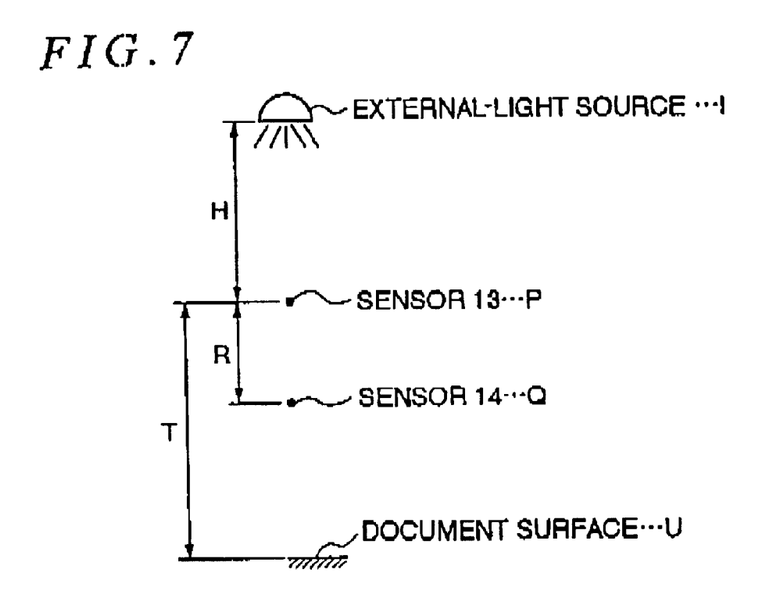
FIG. 7 is an explanatory view showing a positional relationship between an external-light source, an external-light detecting sensor and a document surface of an image reading apparatus according to the third embodiment of the present invention.

Now, the third embodiment of the present invention will be explained with reference to FIGS. 6 and 7. FIG. 6 is an external view showing an image reading apparatus of the third embodiment. FIG. 7 illustrates a positional relationship between an external-light source, external-light detecting sensors 13 and 14, and a document surface in the image reading apparatus of the present embodiment. Compared with the second embodiment in which the apparatus has only one external-light detecting sensor, the third embodiment shows the apparatus having two sensors 13 and 14. Thereby, the external-light amount U which enters into the document surface is calculated more accurately in the present embodiment than in the second embodiment, which makes it possible to carry out the main-scan shading correction with more accuracy.

A method for calculating the external-light amount U which enters into the document surface, in the third embodiment will be described as follows. It is supposed that a height difference between the external-light source and the sensor 13 is H, a height difference between the sensor 13 and the document surface is T, and a height difference between the sensors 13 and 14 is R. According to the relationship that the illuminance is inversely proportional to the second power of the distance, the external-light amount P which enters into the sensor 13, the external-light amount Q which enters into the sensor 14, and the external-light amount U which enters into the document surface are represented by the equations below:

$$P=I/H^2 \qquad [9.1]$$

$$Q=I/(H+R)^2 \qquad [9.2]$$

$$U=I/(H+T)^2 \qquad [9.3]$$

I: luminous intensity of the external-light source

According to the above equations [9.1] and [9.2], the following equation will be derived:

$$P:U=(I/H^2):\{I/(H+T)^2\} \qquad [9.4]$$

According to the equation [9.4], the external-light amount U which enters into the document surface will be represented by the equation below:

$$U=P\times\{H^2/(H+T)^2\} \qquad [9.5]$$

Further, according to the above equations [9.1] and [9.2], the following equation will be derived:

$$P:Q=(I/H^2):\{I/(H+R)^2\} \quad [9.6]$$

The above equation leads to the equation below:

$$P/Q=(H+R)^2/H^2 \quad [9.7]$$

Transforming this equation derives the quadratic equation below:

$$(Q-P)H^2+2QRH+QR^2=0 \quad [9.8]$$

The above equation [9.71] is solved for H as follows:

$$H=[-2QR\pm\sqrt{\{4Q^2R^2-4(Q-P)QR^2\}}]/\{2(Q-P)\}=\{R(\pm\sqrt{PQ}-Q)\}/(Q-P) \quad [9.91]$$

Since the sensor 13 is closer to the external-light source than the sensor 14 as shown in FIG. 7, the external-light amount P which enters into the sensor 13, becomes larger than the external-light amount Q which enters into the sensor 14. Consequently, the denominator (Q−P) of the right-side term in the equation [9.91] becomes negative. Also, the height difference H in the left-side term in the equation [9.91] is always positive, so that the numerator in the right-side term in the equation [9.9] inevitably becomes negative. As a result, the numerator in the right-side term in the equation [9.9] becomes R(−√PQ−Q). The equation [9.9] is expanded as in the following:

$$H=\{R(-\sqrt{PQ}-Q)\}/(Q-P)=\{R(\sqrt{PQ}+Q)\}/(P-Q) \quad [9.10]$$

Substituting the equation [9.10] in the equation [9.5] yields the equation below:

$$U=P[\{R(\sqrt{PQ}+Q)/(P-Q)\}^2]/[\{R(\sqrt{PQ}+Q)/(P-Q)\}+T]^2 \quad [9.11]$$

Next, a procedure for calculating the external-light amount U from the above equation [9.11] will be explained. First of all, before the document reading operation, the T (height difference between the sensor 13 and document surface) is stored in the memory of the apparatus. Secondly, the sensors 13 and 14 detect the external-light amounts P and Q which respectively enter in thereto. Substituting the P, Q and T into the equation [9.11] yields the external-light amount U which enters into the document surface. Then, instead of the external-light amount G in the first embodiment, substituting the calculated external-light amount U into the equation [1]' accurately yields the main-scan shading corrective coefficient β' which is calculated based on the external-light amount detected by two sensors 13 and 14, and in which the height difference between the sensors 13, 14, and the document surface are considered.

The present invention is not restricted to the above-described embodiment, but includes varied or modified embodiments from the above. As described above, the apparatus in the first embodiment is constructed such that the main-scan shading corrective coefficient β' will be determined based on the external-light amount G which is obtained at power-up. For example, however, if the main-scan shading corrective coefficient β' is determined by using the external-light source which is obtained every time the CCD 10 reads out the data in a main-scan directional line, the main-scan shading correction is also carried out with accuracy even in the case that the external light has non-uniform due to a lapse of time.

What is claimed is:

1. An image reading apparatus comprising:
   an irradiator for illuminating a document of which an image is to be read out;
   an image reader for obtaining image data by reading out the image of the document illuminated by at least light from the irradiator;
   at least one detector which is disposed in a position unaffected by the light from the irradiator, for detecting an amount of light other than the light from the irradiator;
   a coefficient generator for generating a coefficient for correcting the image data obtained by the image reader, based on the amount of light detected by the at least one detector; and
   a corrector for correcting the image data obtained by the image reader, based on the coefficient generated by the coefficient generator.

2. An image reading apparatus as claimed in claim 1, wherein said at least one detector comprises at least two detectors.

3. An image reading apparatus as claimed in claim 1, further comprising a document table on which the document to be read out can be loaded in a state that a document surface having the image to be read out faces upwardly such that the image reader will read out the document image from above.

4. An image reading apparatus comprising:
   an irradiator for illuminating a document of which an image is to be read out;
   an image reader for obtaining image data by reading out the image of the document illuminated by at least light from the irradiator;
   a first detector which is disposed in a first position unaffected by the light from the irradiator, for detecting an amount of light other than the light from the irradiator; and
   a controller for using the amount of light detected by the first detector to obtain a coefficient for correcting the image data obtained by the image reader, and for correcting the image data, obtained by the image reader, based on the thus obtained coefficient.

5. An image reading apparatus as claimed in claim 4, further comprising a document table on which the document to be read out can be loaded in a state that a document surface having the image to be read out faces upwardly such that the image reader will read out the document image from above.

6. An image reading apparatus as claimed in claim 5, wherein the controller ascertains the amount of the light other than the light from the irradiator which strikes the document loaded on the document table based on a height difference, between the first detector and the document loaded on the document table, and the light amount detected by said first detector, and the controller obtains the coefficient by using the ascertained light amount.

7. An image reading apparatus as claimed in claim 6, further comprising a second detector which is arranged in a second position which is lower than said first position of said first detector and higher than the document loaded on the document table, for detecting a second amount of light other than the light from the irradiator, wherein the controller ascertains the amount of the light other than the light from the irradiator which strikes the document loaded on the document table based on the height difference, between the first detector and the document loaded on the document table, and the amounts of light detected by said first detector and said second detector.

8. An image reading apparatus as claimed in claim 4, wherein the image reader reads out the document image by using a photoelectric conversion device to scan each line of the document; and, wherein the controller obtains the coefficient by dividing a preset reference output value of the photoelectric conversion device by a value obtained by adding (a) an output value from the photoelectric conversion device obtained by the image reader from reading out a reference document while the document is illuminated by the light from the irradiator only and (b) the light amount detected by the first detector.

9. An image reading apparatus as claimed in claim 8, further comprising a document table on which the document to be read out can be loaded in a state that a document surface having the image to be read out faces upwardly such that the image reader will read out the document image from above.

10. A method for correcting image data which is obtained by reading out a document image illuminated by light from an irradiator, comprising:

a step of detecting, in a first position unaffected by the light from the irradiator, a first amount of light other than the light from the irradiator;

a step of obtaining a coefficient for correcting image data based on the first amount of light detected in said light amount detecting step;

a step of obtaining the image data by reading out an image of the document illuminated by at least the light from the irradiator; and a step of correcting the image data obtained in said image data obtaining step by using the coefficient obtained in said coefficient obtaining step.

11. A method for correcting image data according to claim 10, wherein, in the light amount detecting step, a second amount of the light other than the light from the irradiator is detected in a second position which is different from the first position, and wherein, in the coefficient obtaining step, the coefficient is obtained based on the second amount of light in addition to the first amount of light.

12. A method for correcting image data according to claim 10, wherein, in the image data obtaining step, the document is placed, and read out in a state that a document surface having the image to be read out faces upwardly and is illuminated from above by the irradiator.

13. A method for correcting image data which is obtained by a photoelectric conversion device scanning each line of a document image illuminated by an irradiator, comprising:

a step of reading out a reference document by the photoelectric conversion device while the document is illuminated only by light from the irradiator;

a step of obtaining an output value from the photoelectric conversion device which is outputted when the reference document is read out in the reference document reading step;

a step of detecting, in a first position unaffected by the light from the irradiator, a first amount of light other than the light from the irradiator;

a step of obtaining a coefficient for correcting the image data by dividing a preset reference output value of the photoelectric conversion device by a sum of (a) the output value obtained in said output value obtaining step and (b) the first light amount detected in said light amount detecting step;

a step of obtaining the image data by scanning the image of the document illuminated by at least the light from the irradiator; and a step of correcting the image data obtained in said image data obtaining step based on the coefficient obtained in said coefficient obtaining step.

14. A method for correcting image data according to claim 13, wherein in the light amount detecting step, a second amount of the light other than the light from the irradiator is detected in a second position which is different from the first position, and wherein, in the coefficient obtaining step, said sum includes the second amount of light in addition to the first amount of light.

15. A method for correcting image data according to claim 13, wherein, in the image data obtaining step, the document is placed, and read out in a state that a document surface having the image to be read out faces upwardly and is illuminated from above by the irradiator.

* * * * *

UNITED STATES PATENT AND TRADEMARK OFFICE
CERTIFICATE OF CORRECTION

PATENT NO.    : 6,323,965 B1
DATED         : November 27, 2001
INVENTOR(S)   : Kanehisa Kodan It is certified that error appears in the above-identified patent and that said Letters Patent is hereby corrected as shown below:

Column 1,
Line 5, delete "U.S."
Line 5, delete "Ser.".

Signed and Sealed this

Seventh Day of May, 2002

Attest:

Attesting Officer

JAMES E. ROGAN
Director of the United States Patent and Trademark Office